(12) United States Patent
Steinberger et al.

(10) Patent No.: US 10,737,567 B2
(45) Date of Patent: Aug. 11, 2020

(54) HYBRID MODULE

(71) Applicant: Schaeffler Technologies AG & Co. KG, Herzogenaurach (DE)

(72) Inventors: Markus Steinberger, Macedonia, OH (US); David Smith, Wadsworth, OH (US); Micah Steiner, Orrville, OH (US)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 43 days.

(21) Appl. No.: 16/157,298

(22) Filed: Oct. 11, 2018

(65) Prior Publication Data

US 2019/0126738 A1    May 2, 2019

Related U.S. Application Data

(60) Provisional application No. 62/578,247, filed on Oct. 27, 2017.

(51) Int. Cl.
| | |
|---|---|
| *B60K 6/40* | (2007.10) |
| *B60K 6/26* | (2007.10) |
| *B60K 6/547* | (2007.10) |
| *B60K 6/387* | (2007.10) |
| *F16D 13/52* | (2006.01) |
| *H02K 7/08* | (2006.01) |
| *H02K 7/108* | (2006.01) |
| *H02K 16/02* | (2006.01) |

(Continued)

(52) U.S. Cl.
CPC ............... *B60K 6/40* (2013.01); *B60K 6/26* (2013.01); *B60K 6/387* (2013.01); *B60K 6/547* (2013.01); *F16D 13/52* (2013.01); *H02K 7/006* (2013.01); *H02K 7/085* (2013.01); *H02K 7/088* (2013.01); *H02K 7/108* (2013.01); *H02K 16/02* (2013.01); *H02K 21/24* (2013.01); *B60Y 2200/92* (2013.01); *B60Y 2400/60* (2013.01)

(58) Field of Classification Search
CPC .......... B60K 6/26; B60K 6/387; B60K 6/547; B60K 6/40; F16D 13/52; H02K 7/006; H02K 7/085; H02K 7/088; H02K 7/108; H02K 16/02; H02K 21/24; B60Y 2200/92; B60Y 2400/60
USPC ............................................................. 290/9
See application file for complete search history.

(56) References Cited

U.S. PATENT DOCUMENTS

| | | | |
|---|---|---|---|
| 6,791,222 B1* | 9/2004 | Maslov | H02K 21/12 310/156.38 |
| 7,357,213 B2* | 4/2008 | Ji | F02N 11/006 180/305 |

(Continued)

*Primary Examiner* — Charles Reid, Jr.
(74) *Attorney, Agent, or Firm* — Kevin L. Parks

(57) ABSTRACT

A hybrid module includes a housing, an annular stator, first and second annular rotors, and a first bearing. The housing is arranged for fixing to a combustion engine and a multi-speed transmission of a vehicle. The annular stator is fixed to the housing. The first annular rotor is disposed on a first axial side of the stator. The second annular rotor is disposed on a second axial side of the stator, opposite the first axial side. The first bearing is installed between the first annular rotor or the second annular rotor, and the annular stator. In an example embodiment, the first annular rotor or the second annular rotor includes an annular magnet. In an example embodiment, the first annular rotor is fixed to the second annular rotor.

16 Claims, 2 Drawing Sheets

(51) Int. Cl.
*H02K 7/00* (2006.01)
*H02K 21/24* (2006.01)

(56) References Cited

U.S. PATENT DOCUMENTS

| | | | |
|---|---|---|---|
| 8,920,275 B2* | 12/2014 | Reitz | B60K 6/383 |
| | | | 475/5 |
| 2007/0037659 A1* | 2/2007 | Bailey | F16D 25/10 |
| | | | 475/296 |
| 2007/0228859 A1* | 10/2007 | Rao | H02K 1/12 |
| | | | 310/156.37 |
| 2007/0228860 A1* | 10/2007 | Rao | H02K 1/12 |
| | | | 310/156.37 |
| 2014/0292131 A1* | 10/2014 | Ramamoorthy | H02K 16/02 |
| | | | 310/114 |
| 2019/0044422 A1* | 2/2019 | Suzuki | H02K 21/22 |
| 2019/0105978 A1 | 4/2019 | Steinberger et al. | |

* cited by examiner

HYBRID MODULE

TECHNICAL FIELD

The present disclosure relates generally to a hybrid module, and more specifically to a hybrid module with an annular stator and first and second annular rotors.

BACKGROUND

Hybrid modules are known. One example is shown in commonly-assigned U.S. Provisional Patent Application No. 62/569,468 titled MOTOR ASSEMBLY FOR HYBRID VEHICLE, hereby incorporated by reference as if set forth fully herein.

SUMMARY

According to one embodiment, a hybrid module may include a housing, an annular stator, first and second annular rotors, and a first bearing. The housing is arranged for fixing to a combustion engine and a multi-speed transmission of a vehicle. The annular stator is fixed to the housing. The first annular rotor is disposed on a first axial side of the stator. The second annular rotor is disposed on a second axial side of the stator, opposite the first axial side. The first bearing is installed between the first annular rotor or the second annular rotor, and the annular stator. In an example embodiment, the first annular rotor or the second annular rotor includes an annular magnet. In an example embodiment, the first annular rotor is fixed to the second annular rotor.

In some example embodiments, the hybrid module includes a hub arranged for driving engagement with an input shaft of the multi-speed transmission. The hub is fixed to the first annular rotor and the second annular rotor. In an example embodiment, the hub includes a first tubular protrusion extending in a first axial direction, and the second annular rotor includes a second tubular protrusion extending in a second axial direction, opposite the first axial direction.

In some example embodiments, the hybrid module includes a hub arranged for driving engagement with an input shaft of the multi-speed transmission. The hub and the first annular rotor or the second annular rotor are formed of a same piece of material. In an example embodiment, the hub and the first annular rotor are formed of a same piece of material, the hub includes a first tubular protrusion extending in a first axial direction, and the second annular rotor includes a second tubular protrusion extending in a second axial direction, opposite the first axial direction. In an example embodiment, the first annular rotor includes a tubular protrusion and the first bearing is disposed on the tubular protrusion.

In some example embodiments, the first annular rotor includes a clutch carrier portion. In some example embodiments, the hybrid module includes a drive plate, a clutch pack, and a piston plate. The drive plate is arranged for connection to a crankshaft of the combustion engine. The clutch pack includes at least one first clutch plate drivingly engaged with the clutch carrier portion and at least one second clutch plate drivingly engaged with the drive plate. The piston plate is for compressing the at least one first clutch plate and the at least one second clutch plate to frictionally connect the clutch carrier and the drive plate. In an example embodiment, the hybrid module includes a hub arranged for driving engagement with an input shaft of the multi-speed transmission. The hub is fixed to the first annular rotor and the second annular rotor. The piston plate is sealed to the hub. In some example embodiments, the first annular rotor includes a tubular portion and the piston plate is sealed to the tubular portion. In an example embodiment, the hybrid module includes a backing plate and a plurality of springs. The backing plate is sealed to the piston plate. The plurality of springs are disposed in an axial space between the piston plate and the backing plate.

In some example embodiments, the hybrid module includes an engine hub and a second bearing. The housing includes a radially extending portion, the drive plate is fixed to the engine hub, and the second bearing is installed between the radially extending portion and the engine hub. In an example embodiment, the radially extending portion is sealed to the engine hub. In an example embodiment, the hybrid module includes a damper with a cover plate and a flange. The cover plate is arranged for fixing to a crankshaft of the combustion engine, the engine hub includes a drive spline, and the flange includes a mating spline drivingly engaged with the drive spline. In an example embodiment, the damper includes a plurality of coil springs for transmitting a torque between the cover plate and the flange. In an example embodiment, the second annular rotor includes a tubular protrusion for driving engagement with an oil pump of the multi-speed transmission.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
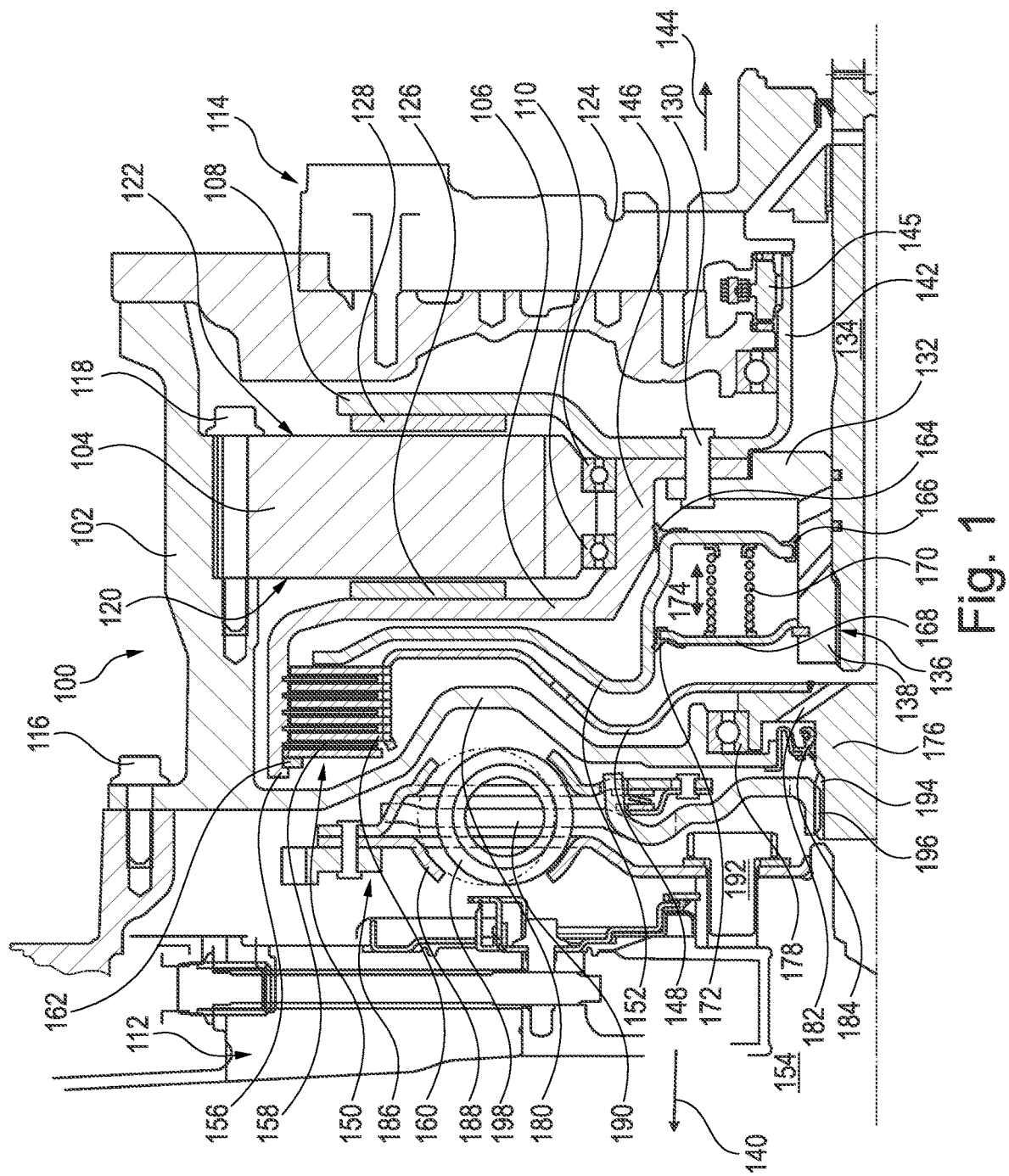
FIG. 1 illustrates a cross-sectional view of a hybrid module according to an example aspect of the present disclosure.

The following description is made with reference to FIG. 1. FIG. 1 illustrates a cross-sectional view of hybrid module 100 according to an example aspect of the present disclosure. Hybrid module 100 includes housing 102, annular stator 104, annular rotor 106, annular rotor 108, and bearing 110. The housing is arranged for fixing to combustion engine 112 and multi-speed transmission 114 of a vehicle (not shown). That is, the housing is bolted to the engine 112 at bolt 116 and transmission 114 is bolted to the housing. Stator 104 is fixed to the housing at bolt 118, for example. Rotor 106 is disposed on axial side 120 of the stator. Rotor 108 is disposed on axial side 122 of the stator. Side 122 is opposite side 120. Bearing 110 is installed between rotor 106 and the stator. Bearing 124 is also installed between rotor 106 and the stator. Other embodiments (not shown) may include bearing 110 and/or bearing 124 installed between rotor 108 and the stator.

Annular rotor 106 includes annular magnet 126 and annular rotor 108 includes annular magnet 128. Annular rotor 106 is fixed to annular rotor 108 at rivet 130, for example. The hybrid module also includes hub 132 arranged for driving engagement with input shaft 134 of the multi-speed transmission at spline 136, for example. The hub is fixed to the annular rotors by rivet 130. Hub 132 includes tubular protrusion 138 extending in axial direction 140. Annular rotor 108 includes tubular protrusion 142 extending in axial direction 144, opposite axial direction 140. Tubular protrusion 142 is for driving engagement with oil pump 145 of the multi-speed transmission. Annular rotor 106 includes tubular protrusion 146. Bearing 110 is disposed on tubular protrusion 146.

The hybrid module also includes drive plate 148, clutch pack 150 and piston plate 152. Drive plate 148 is arranged for connection to crankshaft 154 of the combustion engine as described below. Annular rotor 106 includes clutch carrier portion 156. The clutch pack includes clutch plate 158 drivingly engaged with the clutch carrier and clutch plate 160 drivingly engaged with the drive plate. In the embodiment shown, the clutch pack includes interleaved multiples of clutch plates 158 and 160. The piston plate is for compressing the clutch plates to frictionally connect the clutch carrier and the drive plate as is known in the art. Snap ring 162 axially retains the clutch pack when the piston plate applies axial force.

Piston plate 152 is sealed to tubular portion 146 by seal 164, for example. Piston plate 152 is sealed to hub 132 by seal 166, for example. The hybrid module also includes backing plate 168 and spring 170. Spring 170 may be a plurality of springs 170. The backing plate is sealed to the piston plate by seal 172, for example. Springs 170 are disposed in axial space 174 between the piston plate and the backing plate. Hybrid module 100 includes engine hub 176 and bearing 178. Housing 102 includes radially extending portion 180. Drive plate 148 is fixed to the engine hub at weld 182, for example. Bearing 178 is installed between the radially extending portion and the engine hub. The radially extending portion is sealed to the engine hub at seal 184, for example.

The hybrid module also includes damper 186 with cover plate 188 and flange 190. The cover plate is arranged for fixing to crankshaft 154 of the combustion engine by bolt 192, for example. Engine hub 176 includes drive spline 194 and the flange includes mating spline 196 drivingly engaged with the drive spline. The damper includes coil springs 198 for transmitting a torque between the cover plate and the flange as is known in the art.

Figure 2:
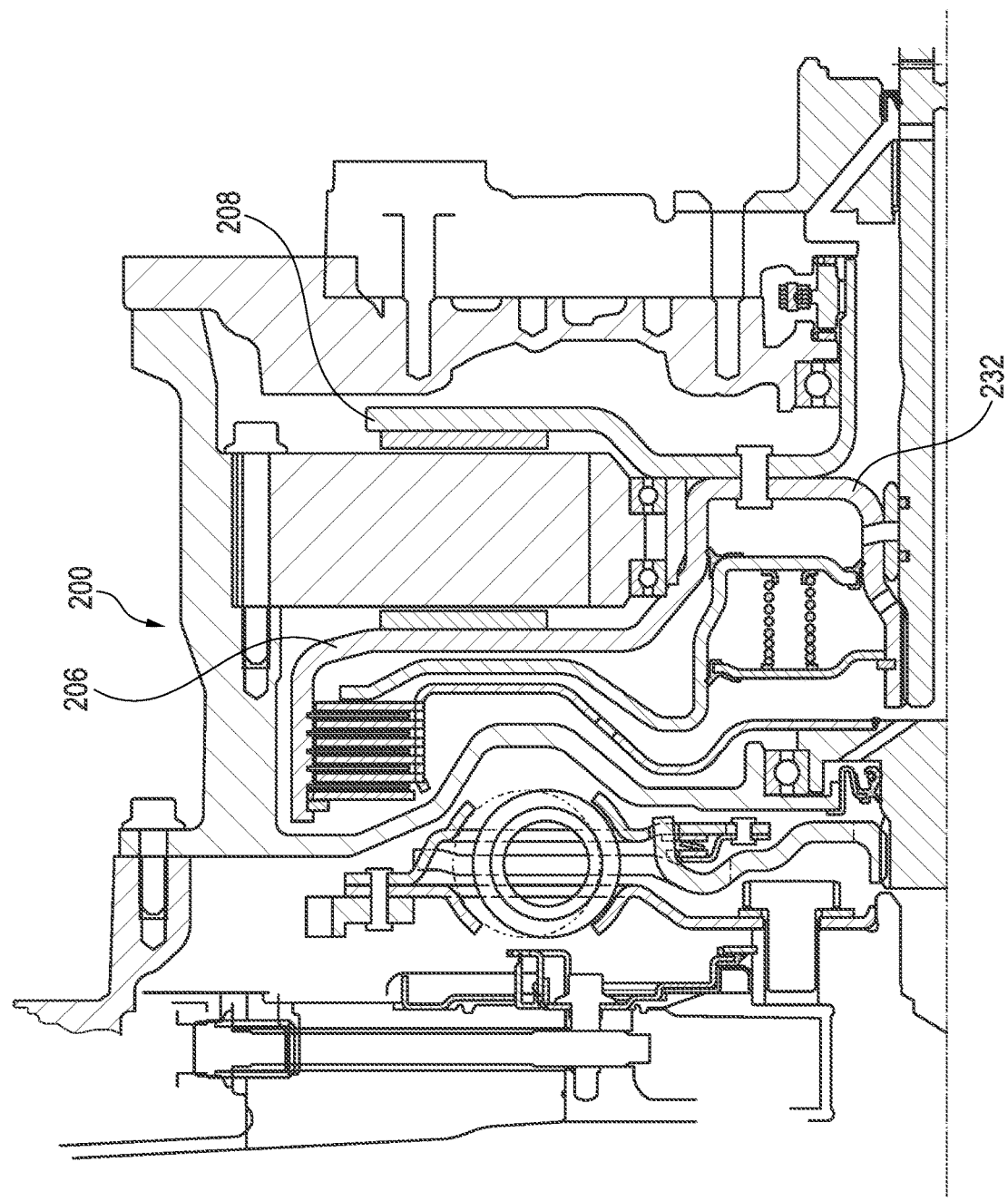
FIG. 2 illustrates a cross-sectional view of an alternative embodiment of the hybrid module of FIG. 1.

The following description is made with reference to FIG. 2. FIG. 2 illustrates a cross-sectional view of alternative embodiment 200 of the hybrid module of FIG. 1. Hybrid module 200 differs from hybrid module 100 in the manner described below. Hub 232 and annular rotor 206 are formed from a same piece of material. Although, annular rotor 206 is shown integral with hub 232, other embodiments (not shown) may include rotor 208 integral with hub 232.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS

100 Hybrid module
102 Housing
104 Annular stator
106 Annular rotor
108 Annular rotor
110 Bearing
112 Combustion engine
114 Multi-speed transmission
116 Bolt
118 Bolt
120 Axial side
122 Axial side
124 Bearing
126 Annular magnet
128 Annular magnet
130 Rivet
132 Hub
134 Input shaft
136 Spline
138 Tubular protrusion
140 Axial direction
142 Tubular protrusion
144 Axial direction
145 Oil pump
146 Tubular protrusion
148 Drive plate
150 Clutch pack
152 Piston plate
154 Crankshaft
156 Clutch carrier portion
158 Clutch plate 160 Clutch plate
162 Snap ring
164 Seal
166 Seal
168 Backing plate
170 Spring
172 Seal
174 Axial space
176 Engine hub
178 Bearing
180 Radially extending portion
182 Weld
184 Seal
186 Damper
188 Cover plate
190 Flange
192 Bolt
194 Drive spline
196 Mating spline
198 Coil springs
200 Hybrid module
206 Annular rotor
208 Annular rotor
232 Hub

What is claimed is:

1. A hybrid module, comprising:
a housing arranged for fixing to a combustion engine and a multi-speed transmission of a vehicle;
an annular stator fixed to the housing;
a first annular rotor disposed on a first axial side of the annular stator and comprising a clutch carrier portion;
a second annular rotor disposed on a second axial side of the annular stator, opposite the first axial side;
a first bearing installed between the first annular rotor or the second annular rotor, and the annular stator;
a drive plate arranged for connection to a crankshaft of the combustion engine;
a clutch pack including at least one first clutch plate drivingly engaged with the clutch carrier portion and at least one second clutch plate drivingly engaged with the drive plate; and,
a piston plate for compressing the at least one first clutch plate and the at least one second clutch plate to form a connection between the clutch carrier portion and the drive plate.

2. The hybrid module of claim 1 wherein the first annular rotor or the second annular rotor includes an annular magnet.

3. The hybrid module of claim 1 wherein the first annular rotor is fixed to the second annular rotor.

4. The hybrid module of claim 1 further comprising a hub arranged for driving engagement with an input shaft of the multi-speed transmission, the hub being fixed to the first annular rotor and the second annular rotor.

5. The hybrid module of claim 4 wherein the hub includes a first tubular protrusion extending in a first axial direction, and the second annular rotor includes a second tubular protrusion extending in a second axial direction, opposite the first axial direction.

6. The hybrid module of claim 1 further comprising a hub arranged for driving engagement with an input shaft of the multi-speed transmission, the hub and the first annular rotor or the second annular rotor being formed of a same piece of material.

7. The hybrid module of claim 6 wherein:
the hub and the first annular rotor are formed of the same piece of material;
the hub includes a first tubular protrusion extending in a first axial direction; and,
the second annular rotor includes a second tubular protrusion extending in a second axial direction, opposite the first axial direction.

8. The hybrid module of claim 1 wherein the first annular rotor includes a tubular protrusion and the first bearing is disposed on the tubular protrusion.

9. The hybrid module of claim 1 further comprising a hub arranged for driving engagement with an input shaft of the multi-speed transmission, wherein:
the hub is fixed to the first annular rotor and the second annular rotor; and,
the piston plate is sealed to the hub.

10. The hybrid module of claim 1 wherein the first annular rotor includes a tubular portion and the piston plate is sealed to the tubular portion.

11. The hybrid module of claim 10 further comprising a backing plate and a plurality of springs; wherein:
the backing plate is sealed to the piston plate; and,
the plurality of springs are disposed in an axial space between the piston plate and the backing plate.

12. The hybrid module of claim 1 further comprising an engine hub and a second bearing, wherein:
the housing includes a radially extending portion;
the drive plate is fixed to the engine hub; and,
the second bearing is installed between the radially extending portion and the engine hub.

13. The hybrid module of claim 12 wherein the radially extending portion is sealed to the engine hub.

14. The hybrid module of claim 12 further comprising a damper including a cover plate and a flange, wherein:
the cover plate is arranged for fixing to the crankshaft of the combustion engine;
the engine hub includes a drive spline; and,
the flange includes a mating spline drivingly engaged with the drive spline.

15. The hybrid module of claim 14 wherein the damper includes a plurality of coil springs for transmitting a torque between the cover plate and the flange.

16. The hybrid module of claim 1 wherein the second annular rotor includes a tubular protrusion for driving engagement with an oil pump of the multi-speed transmission.

* * * * *